United States Patent
Nogin et al.

(10) Patent No.: US 9,846,596 B1
(45) Date of Patent: Dec. 19, 2017

(54) SYSTEM AND METHOD FOR CLOUD CONTROL OPERATIONS PLANE BASED ON PROACTIVE SECURITY ALGORITHMS

(71) Applicant: HRL Laboratories, LLC, Malibu, CA (US)

(72) Inventors: Aleksey Nogin, Fresno, CA (US); Kirill Minkovich, Campbell, CA (US); Karim El Defrawy, Santa Monica, CA (US); Joshua W. Baron, Los Angeles, CA (US); Eric P. Tressler, Oakland, MD (US); Gavin D. Holland, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 335 days.

(21) Appl. No.: 14/313,543

(22) Filed: Jun. 24, 2014

Related U.S. Application Data (60) Provisional application No. 61/838,739, filed on Jun. 24, 2013.

(51) Int. Cl.
G06F 9/48 (2006.01)

(52) U.S. Cl.
CPC .................... *G06F 9/4881* (2013.01)

(58) Field of Classification Search
CPC ......... G06F 21/32; G06F 21/56; G06F 9/4881
USPC ......................................................... 726/17
See application file for complete search history.

(56) References Cited

U.S. PATENT DOCUMENTS

| | | | | |
|---|---|---|---|---|
| 6,950,937 B2* | 9/2005 | Jakobsson | ............... | G06F 7/723 380/37 |
| 8,639,552 B1* | 1/2014 | Chen | ..................... | G06F 9/4881 705/7.21 |
| 8,700,906 B2* | 4/2014 | Kamara | ................ | G06F 9/5072 713/180 |
| 2011/0154350 A1* | 6/2011 | Doyle | ................... | G06F 9/5044 718/104 |

(Continued)

OTHER PUBLICATIONS

Schultz, et.al, Brief Announcement: Mobile Proactive Secret Sharing, [online], Aug. 2008, [retrieved on May 30, 2016]. Retrieved from the Internet:<URL: http://delivery.acm.org/10.1145/1410000/1400856/p458-schultz.pdf?ip=151.207.250.71&id=1400856&acc=ACTIVE%20SERVICE&key=C15944E53D0ACA63%2E4D4702B0C3E38B35%2E4D4702B0C3E38B35%2E4D47.*

(Continued)

*Primary Examiner* — Matthew Smithers
(74) *Attorney, Agent, or Firm* — Tope-McKay & Associates (57) ABSTRACT

Described is a system for a cloud control operations plane. In operation, a job is broadcast to a plurality of physical hosts, one or more of the physical hosts having a control operations plane (COP) node and a service node associated with the COP node. The COP nodes jointly create a private job assignment. A set of job assignments is redundantly distributed to individual COP nodes pursuant to the private job assignments, such that each individual COP node is only aware of its own assignment and corresponding job. The service nodes then each complete a task associated with the job and generate an output. When a set of service nodes performing a redundant job complete their task, the corresponding COP nodes jointly perform a private result checking protocol to generate a final output. The final output is then sent to the user.

21 Claims, 6 Drawing Sheets

(56) References Cited

U.S. PATENT DOCUMENTS

| | | | | | |
|---|---|---|---|---|---|
| 2012/0005682 | A1* | 1/2012 | Doyle | ............... | G06F 9/4881 718/102 |
| 2013/0212709 | A1* | 8/2013 | Tucker | ............... | G06F 21/55 726/29 |
| 2014/0201753 | A1* | 7/2014 | He | ............... | G06F 9/4881 718/104 |

OTHER PUBLICATIONS

Somorovsky et al., "All Your Clouds are Belong to us—Security Analysis of Cloud Management Interfaces", Oct. 21, 2011., ACM, pp. 3-14.*

Amos Beimel. Secret-sharing schemes: A Survey. In Yeow Chee, Zhenbo Guo, San Ling, Fengjing Shao, Yuansheng Tang, Huaxiong Wang, and Chaoping Xing, editors, Coding and Cryptology, vol. 6639 of Lecture Notes in Computer Science, pp. 11-46, Springer, 2011. DOI: 10.1007/978-3-642-20901-7_2. URL: http://-www.cs.bgu.ac.il/-~beimel/-Papers/-Survey.pdf.

G.R. Blakley. Safeguarding cryptographic keys. Managing Requirements Knowledge, International Workshop on, 0:313, 1979. DOI: 10.1109/AFIPS.1979.98.

Michael Ben-Or, Shafi Goldwasser, and Avi Wigderson. Completeness theorems for non-cryptographic fault-tolerant distributed computation. In Proceedings of the twentieth annual ACM symposium on Theory of computing, STOC '88, pp. 1-10, New York, NY, USA, 1988. ACM. ISBN 0-89791-264-0. DOI: 10.1145/62212.62213.

David Chaum, Claude Crépeau, and Ivan Damgård. Multiparty unconditionally secure protocols, In Proceedings of the twentieth annual ACM symposium on Theory of computing, STOC '88, pp. 11-19, New York, NY, USA, 1988. ACM. ISBN 0-89791-264-0. DOI: 10.1145/62212.62214.

Yvo Desmedt and Sushil Jajodia, Redistributing secret shares to new access structures and its applications. Technical report, George Mason University, 1997. URL: ftp://-ftp.cs.uwm.edu-pub/-tech_reports/-desmedt-redistribution.ps. Tech. Report ISSE-TR-97-01.

Ivan Damgård and Jesper Buus Nielsen. Scalable and unconditionally secure multiparty computation. In Proceedings of the 27th annual international cryptology conference on Advances in cryptology, CRYPTO'07, pp. 572-590, Berlin, Heidelberg, 2007. Springer-Verlag. ISBN 3-540-741142-9, 978-3-540-74124-8, URL: http://-www.iacr.org/-archive/-crypto2007/-46220565/-46220565.pdf.

O. Goldreich. S. Micali, and A. Wigderson, How to play any mental game. In Proceedings of the nineteenth annual ACM symposium on Theory of computing, STOC '87, pp. 218-229, New York, NY, USA, 1987. ACM. ISBN 0-89791-221-7: DOI: 10.1145128395.28420.

Yuval Ishai, Eyal Kushilevitz. Rafail Ostrovsky, and Amit Sahai. Batch codes and their applications. In Lászl ÅBabai, editor, STOC, pp. 262-271. ACM, 2004. ISBN 1-58113-852.0. DOI: 10.1145/1007352.1007396.

Rafail Ostrovsky and Moti Yung. How to withstand mobile virus attacks (extended abstract). In Proceedings of the tenth annual ACM symposium on Principles of distributed computing (PODC'91), pp. 51-59, New York, NY, USA, 1991, ACM, ISBN 0-89791-439-2. DOI: 10.1145/112600.112605. URL: http://-www.cs.ucla.edu/-~rafail/-PUBLIC/-05.pdf.

Adi Shamir, How to share a secret. Commun. ACM, 22:612-613, Nov. 1979. ISSN 0001-0782. DOI: 10.1145/359168.359176.

David Schultz, Barbara Liskov, and Moses Liskov. Mobile proactive secret sharing. In Twenty-Seventh Annual ACM SIGACT-SIGOPS Symposium on Principles of Distributed Computing (PODC). Aug. 2008. URL: http://-www.pmg.csail.mit.edu/-pubs-MPSS-brief-abstract.html. Brief Announcement.

Lidong Zhou, Fred B. Schneider, and Robbert Van Renesse. COCA: A secure distributed online certification authority. ACM Trans. Comput. Sys., 20:329-368, Nov. 2002. ISSN 0734-2071, DOI: 10.1145/571637.571638.

* cited by examiner

SYSTEM AND METHOD FOR CLOUD CONTROL OPERATIONS PLANE BASED ON PROACTIVE SECURITY ALGORITHMS

STATEMENT REGARDING FEDERALLY SPONSORED RESEARCH OR DEVELOPMENT

This invention was made with Government support under Contract No. HSHQDC-13-C-B0026 awarded by Department of Homeland Security. The Government has certain rights in the invention.

CROSS-REFERENCE TO RELATED APPLICATIONS

This is a non-provisional patent application of U.S. Provisional Application No. 61/838,739, filed on Jun. 24, 2013, entitled, "Cloud control operations plane based on proactive security algorithms."

FIELD OF INVENTION

The present invention relates to a security system and, more particularly, to a security system that implements secure secret sharing and secure multi-party computation protocols to provide a unique defensive capability for clouds and other distributed resource sharing systems.

BACKGROUND OF INVENTION

The "cloud" is a term that is associated with cloud computing. In computer networking, cloud computing is a computing process that involves multiple computers connected through some form of a communication network, such as a local area network or the Internet. As can be appreciated, as with any networked computing system, with a cloud there are always security risks that must be addressed. Current cloud security approaches are based on virtualization, separation and access control. In such approaches, machines have to be manually disinfected; they cannot be recovered quickly in the face of automated attacks. A comprehensive solution must be resilient in the face of significant node corruption and must be regenerative so that lost nodes are later recovered. An attacker that compromises a node can steal data, corrupt computation and learn about cloud control execution.

Multiparty computation (MPC) allows a group of servers (sometimes called players or parties) to provide inputs to an arithmetic (or Boolean) circuit and securely evaluate the circuit in the presence of an adversary who may corrupt a fixed portion of the servers. As noted above, when the adversary corrupts a server, it learns all information stored on that server. The adversary can force corrupt servers to behave arbitrarily, irrespective of the protocol.

Although there are numerous published MPC protocols, none of the published protocols allow a set of servers to change in the middle of a computation, in what would be considered proactive. The only previous work on a proactive MPC is the work of Rafail Ostrovsky and Moti Yung in "How to withstand mobile virus attacks," (See the List of Incorporated Cited Literature References, Literature Reference No. 9). A disadvantage of the protocol by Ostrovsky and Yung is that it is not explicit, in that it does not provide the details of each step to perform and required computations and communication (i.e., the paper only provides a high level argument and description of why it is possible to construct such a protocol). The protocol of Ostrovsky and Yung is also inefficient. The efficiency is not explicitly stated, but it is at least $\Omega(DCn^3)$ (where D is the circuit depth, C is the number of gates in the circuit and in is the number of servers). While proactive secret-sharing has been used in the past, its use has so far been limited to protecting specialized computations, such as those required by a certification authority (see Literature Reference No. 12).

While there have been many secure operating systems and many operating systems that restore to a pristine state, none of them employed cryptographic techniques to use adjoining nodes for state reconstruction in a cloud architecture. Thus, a continuing need exists for a proactive secret sharing (PSS) approach that is operable for protecting control operations in a general-purpose cloud-computing architecture.

SUMMARY OF INVENTION

Described is a system for a cloud control operations plane that implements secure secret sharing and secure multi-party computation protocols to provide a unique defensive capability for clouds and other distributed resource sharing systems. The system includes one or more processors and a memory. The memory is a non-transitory computer-readable medium having executable instructions encoded thereon, such that upon execution of the instructions, the one or more processors perform several operations. For example, one or more processors broadcast an executable job to a plurality of physical hosts, one or more of the physical hosts having a control operations plane (COP) node and one or more service nodes associated with the COP node. The COP nodes joint create a private job assignment. Thereafter, a first set of job assignments are redundantly distributed to individual COP nodes pursuant to the private job assignment, such that each individual COP node is only aware of its own assignment and corresponding job. The service nodes execute the jobs assigned to the individual COP nodes such that the service nodes each complete a task associated with the job and generate an output, which is then provided to the user or other systems for use therein.

In another aspect, when a set of service nodes are performing a redundant job complete their task, the service nodes forward the outputs to corresponding COP nodes, with the corresponding COP nodes jointly performing a private result checking protocol to generate the output.

In yet another aspect, the COP nodes employ a mobile proactive secret sharing scheme which allows a set of COP nodes and a threshold number of COP nodes to change.

In another aspect, the COP nodes operate using secure multi-party computation (MPC) to securely compute any distributed functionality.

In yet another aspect, each COP node is periodically regenerated to a pristine state. In doing so, each COP node is adapted to operate continuously, even if corrupted.

Further, each COP is adapted to provide anonymous communication between a set of service nodes completing a shared task, so that the set of services nodes can anonymously communicate with one another without obtaining information about each other and the physical nodes upon which the services nodes reside.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a security system and, more particularly, to a security system that implements secure secret sharing and secure multi-party computation protocols to provide a unique defensive capability for clouds and other distributed resource sharing systems. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited literature references is provided. Next, a description of the various principal aspects of the present invention is provided. Subsequently, an introduction provides the reader with a general understanding of the present invention. Finally, specific details of the present invention are provided to give an understanding of the specific aspects.

(1) LIST OF INCORPORATED CITED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number.

1. Amos Beimel. Secret-sharing schemes: A survey. In Yeow Chee, Zhenbo Guo, San Ling, Fengjing Shao, Yuansheng Tang, Huaxiong Wang, and Chaoping Xing, editors, *Coding and Croptology*, volume 6639 of *Lecture Notes in Computer Science*, pages 11-46. Springer, 2011.
2. G. R. Blakley. Safeguarding cryptographic keys. *Managing Requirements Knowledge, International Workshop on*, 0:313, 1979.
3. Michael Ben-Or, Shafi Goldwasser, and Avi Wigderson. Completeness theorems for non-cryptographic fault-tolerant distributed computation. In *Proceedings of the twentieth annual ACM symposium on Theory of computing*, STOC '88, pages 1-10, New York, N.Y., USA, 1988.
4. David Chaum, Claude Crépeau, and Ivan Damgård. Multiparty unconditionally secure protocols. In *Proceedings of the twentieth annual ACM symposium on Theory of computing*, STOC '88, pages 11-19, New York, N.Y., USA, 1988.
5. Yvo Desmedt and Sushil Jajodia. Redistributing secret shares to new access structures and its applications. Technical report, George Mason University, 1997.
6. Ivan Damgård and Jesper Buus Nielsen. Scalable and unconditionally secure multiparty computation. In *Proceedings of the 27th annual international cryptology conference on Advances in cryptology*, CRYPTO '07, pages 572-590, Berlin, Heidelberg, 2007.
7. O. Goldreich, S. Micali, and A. Wigderson. How to play ANY mental game. In *Proceedings of the nineteenth annual ACM symposium on Theory of computing*, STOC '87, pages 218-229, New York, N.Y., USA, 1987.
8. Yuval Ishai, Eyal Kushilevitz, Rafail Ostrovsky, and Amit Sahai. Batch codes and their applications. In László Babai, editor, *STOC*, pages 262-271. ACM, 2004.
9. Rafail Ostrovsky and Moti Yung. How to withstand mobile virus attacks (extended abstract). In *Proceedings of the tenth annual ACM symposium on Principles of distributed computing (PODC '91)*, pages 51-59, New York, N.Y., USA, 1991.
10. Adi Shamir. How to share a secret. *Commun. ACM*, 22:612-613, November 1979.
11. David Schultz, Barbara Liskov, and Moses Liskov. Mobile proactive secret sharing. In *Twenty-Seventh Annual ACM SIGACT-SIGOPS Symposium on Principles of Distributed Computing (PODC)*, August 2008.

12. Lidong Zhou, Fred B. Schneider, and Robbert Van Renesse. COCA: A secure distributed online certification authority. *ACM Trans. Comput. Syst.*, 20:329-368, November 2002.

(2) PRINCIPAL ASPECTS

The present invention has three "principal" aspects. The first system for a cloud control operations plane based on proactive security algorithms. The system is a cloud protection architecture that is typically in the form of one or more computer systems operating software or in the form of a "hard-coded" instruction set. In the cloud architecture, the system is generally implemented across more than one computer. This system may be incorporated into a wide variety of devices that provide different functionalities. The second principal aspect is a method, typically in the form of software, operated using a data processing system(s) (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
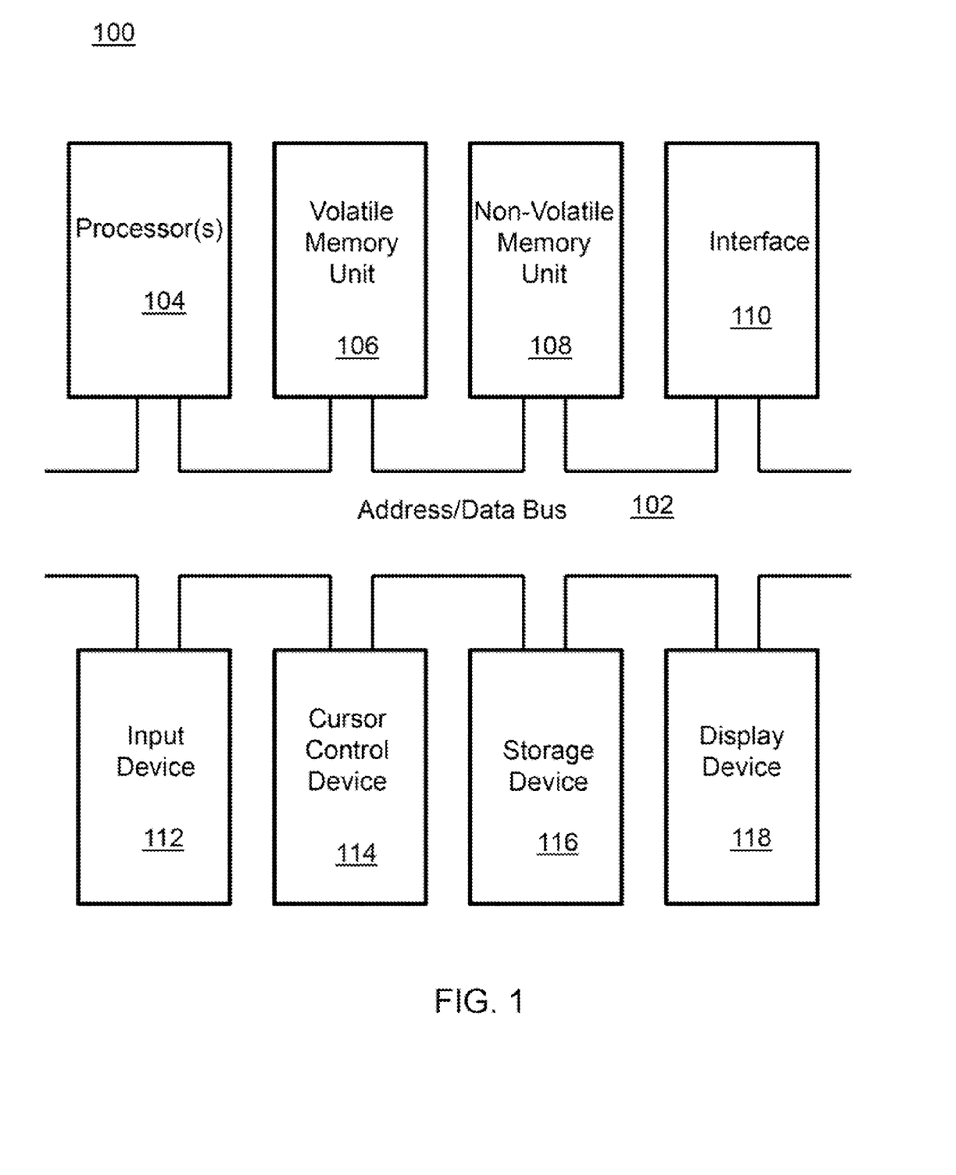
FIG. 1 is a block diagram depicting the components of a system according to the principles of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
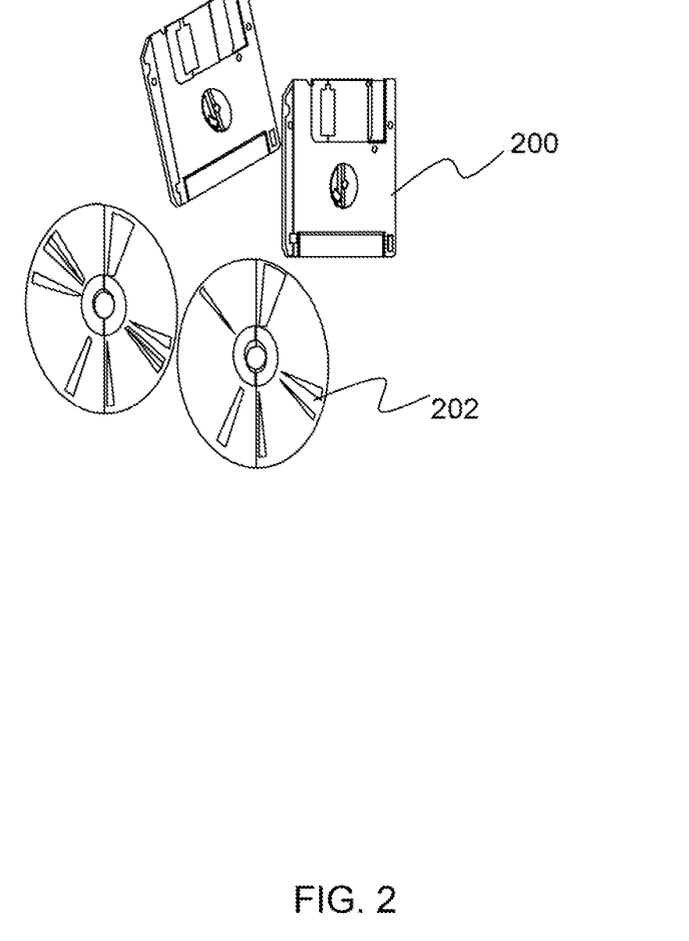
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

As noted above, while there have been many secure operating systems and many operating systems that restore to a pristine state, none of them employed cryptographic techniques to use adjoining nodes for state reconstruction in a cloud architecture. Thus, described is a system that addresses this issue by providing an architecture that takes advantage of proactively secure secret sharing and secure multi-party computation protocols to provide a unique defensive capability for clouds and other distributed resource sharing systems. The defenses include a self-healing software mechanism for the entire cloud and hardware-assisted regeneration of compromised (or faulty) nodes from a pristine state. The system can be implemented to provide a secure and resilient cloud computation platform.

The architecture is based on a principled separation of distributed task supervision from the cloud computation of user-defined jobs (or missions). The task supervision and end-user communication is performed by the Control Operations Plane (COP), which builds a trustworthy and resilient, self-healing, provably secure cloud out of the underlying untrustworthy and faulty hosts. The COP employs cryptographic protocols that are robust in the presence of many corrupted participants—the COP-protected cloud regularly and unobtrusively refreshes itself by restoring (regenerating) COP nodes from a pristine state at regular intervals. More specifically, the infrastructure provides a comprehensive solution for a mission-oriented cloud-computing infrastructure, in that: A) it ensures a state of collective immunity that exceeds that provided by a single cloud server; B) it heals itself and regenerates nodes in the case of malicious attacks or chance failures ("public health"); C) it employs manageable and taskable diversity to implement moving target proactive defense techniques. The specific details of the system architecture are provided below.

(4) SPECIFIC DETAILS OF THE INVENTION

(4.1) Overview

Figure 3:
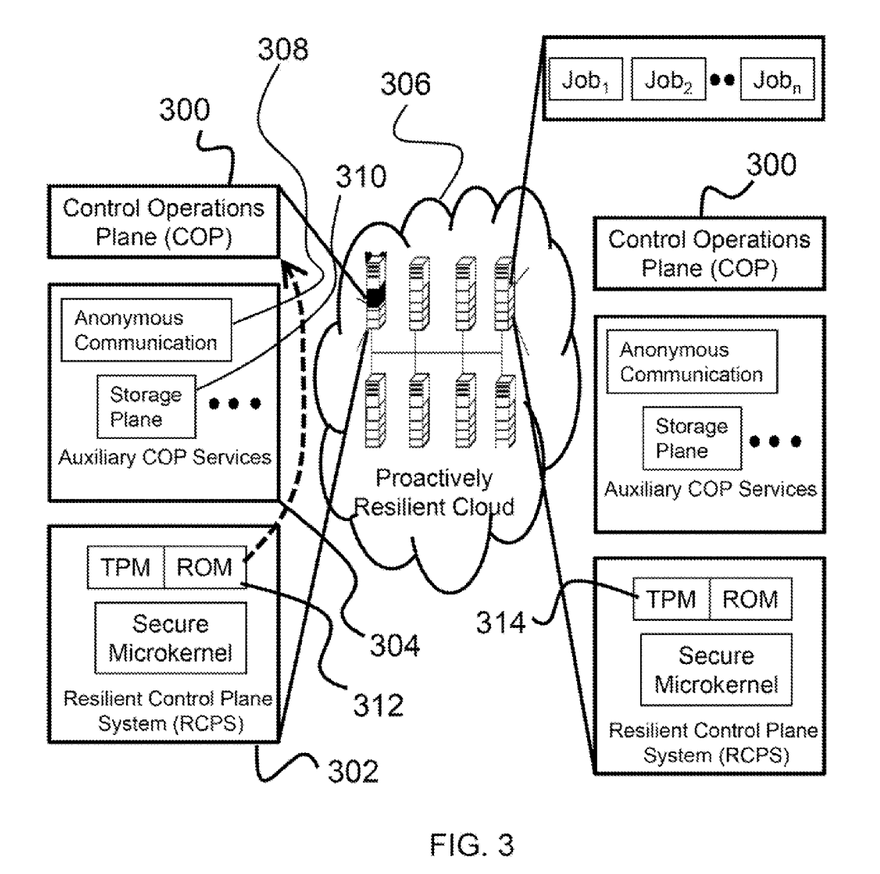
FIG. 3 is a diagram illustrating a mission-oriented, cloud control-operations-plane (COP) infrastructure according to the principles of the present invention.

As described above, the present invention is directed to a system that incorporates a cloud protection architecture. In a desired aspect and as illustrated in FIG. 3, the cloud protection architecture is composed of three major components, including: (1) a Control Operations Plane (COP) 300, (2) a Resilient Control Plane System (RCPS) 302, and (3) Auxiliary COP Services 304. Each of these components are described in further detail below. Throughout this section, it is helpful to note that the following terminology is used: a "physical node" contains many computation "nodes", where each physical node is a physical piece of hardware (i.e., physical host). Each computation node is any logical subdivision within a physical node, a non-limiting example of which includes a virtual machine. Each physical node can contain one or more computational nodes. On each physical node, there is at most one node denoted the "COP node"; all other nodes are denoted "service nodes". The collection of COP nodes constitutes the COP; the collection of service nodes constitutes the "data plane."

The first major component and the heart of the present invention is the Control Operations Plane (COP) 300. The COP 300 is the root of trust of the cloud defenses, it is responsible for job supervision and overall cloud control, but does not perform user computations, which are executed by service nodes directly. Each physical node contains at most one COP node. The COP nodes communicate using advanced cryptographic protocols (outlined below and described in more detail in Section 4.2). Even if the attacker can fully compromise and take over any individual COP node, the integrity of the COP as a whole remains intact. An attacker would need to compromise at least ⅙ (this value is explained in Section 4.4.4) of the COP nodes to learn any of the secrets protected by the COP, including the control state of the cloud (e.g., which jobs are assigned to which physical nodes). The COP can perform decentralized computations on this protected information without ever reconstituting the secret at any single node of the cloud.

One of the central tasks of the COP is anonymous mapping of jobs. A job is a unit of work that the cloud is tasked with performing, sometimes referred to as a mission. Jobs could be single-node, intended to be performed on a single service node, or multi-node, intended to be performed by several service nodes. By allocation of jobs, it is meant to select a specific service node or nodes that would be tasked with performing the job.

By using its decentralized and resilient computation protocol, the COP is able to allocate jobs in such a way that only the physical node to which the job is allocated learns where the job is. The other nodes, any attacker monitoring the physical node traffic, and the user submitting the job are all unable to tell where in the cloud the job is executed and how many times it is replicated. Similarly, the COP is able to deliver job output to the user without revealing any information that would allow an attacker to "map out" the cloud 306 or learn which parts of the cloud would be the most advantageous to attack. The robust result delivery mechanism also provides the ability to spot-check the result by selectively replicating a small portion of the jobs and comparing the results of the replicas in a way that is unpredictable to an attacker. A higher degree of replication and more COP supervision can be used to provide more security, because a majority of the replicas must be successfully attacked to overcome majority voting and to keep the correct result from being reported to the user (see Section 4.3 for more details).

The second major component is the Resilient Control Plane System (RCPS) 302, designed to protect the COP 300 itself. The RCPS 302 combines hardware-assisted isolation of the COP 300 operating system (OS) from the OS responsible for computing jobs together with a non-persistent resilient architecture to achieve this goal.

The ROM 312 in the figure refers to a read-only memory that is used to store the pristine state of a cloud node; the read-only characteristics are enforced by the ROM device itself, so the contents of the ROM device can not be altered even when the node software is fully subverted by the attacker. The TPM 314 in FIG. 3 refers to a Trusted Platform Module, which is a hardware feature of a physical node used to make sure that the node's cryptographic identity can not be compromised, even if the node's software is fully controlled by the attacker.

The third major component is Auxiliary COP Services 304, which implements a set of auxiliary COP tasks that are apart from the core COP protocols. To prevent an attacker from mapping out the cloud job assignments, it is essential that any single component of a distributed multi-node job does not know the allocation of the other job components as these allocations change dynamically. To achieve this, the COP 300 sets up, in a private manner, multi-node routing tables for a job, where a node required to send a message will only know its next hop neighbor in the routing table (and no other information). This implements "light-weight" anonymous communication 308 channels without resorting to more expensive anonymous communication protocols, such as onion routing. Other auxiliary services may also reside in the COP virtual partition, such as the storage layer 310 for user-provided, long-lived cloud data.

(4.2) Data Flow

Figure 4:
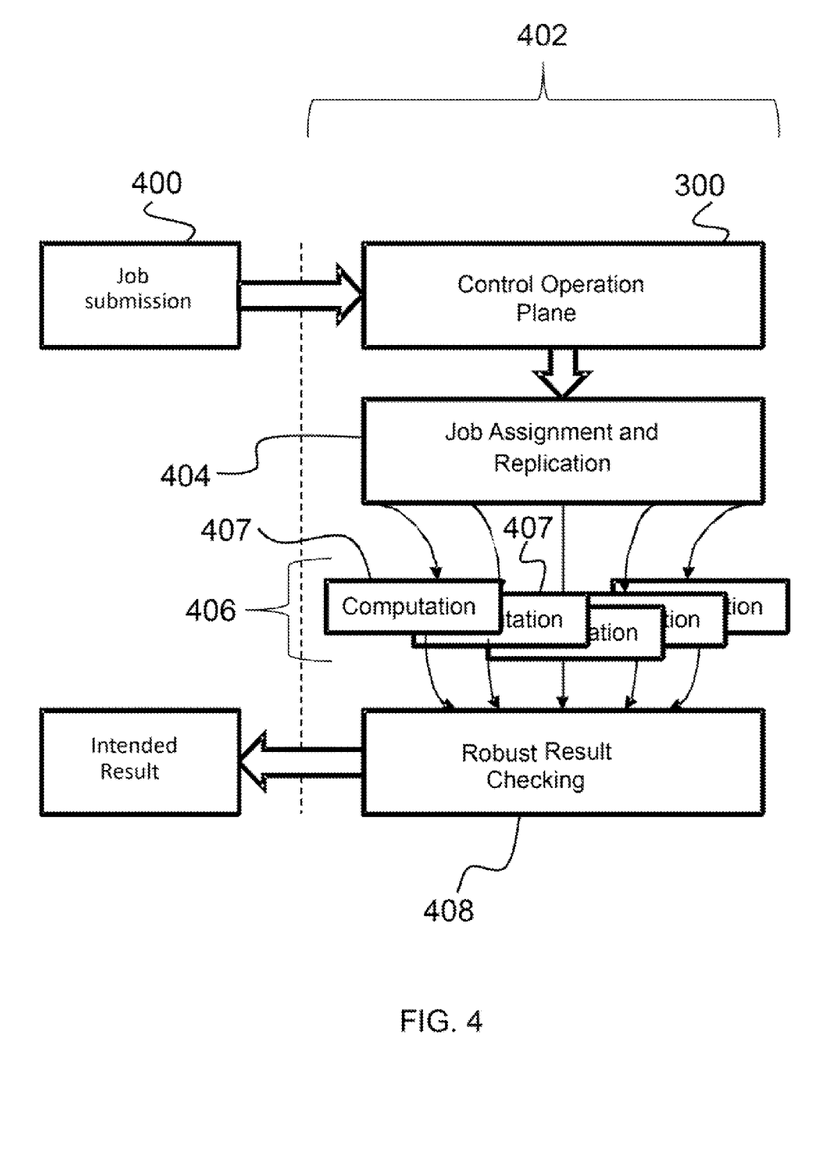
FIG. 4 is a block diagram illustrating data flow for a COP-protected cloud.

The overall data flow of the cloud architecture is illustrated in FIG. 4. First, a user has a job 400 for the cloud 402 to execute. The user sends the job 400 to the cloud 402 by broadcasting it to all physical nodes that have a COP node 300. The COP nodes 300 (even if some are compromised) jointly create a private job assignment schedule 404: the COP nodes 300 jointly distribute job assignments 404 to individual COP nodes, which assign jobs to the service nodes that reside at their host. It be noted that although the term "schedule" invokes an association with some sort of sequencing, the assignments are binary, such that each COP node either receives a job assignment, or it does not. For example, each COP node receives either a random noise, or a copy of the job decryption key, depending whether it should be running the job.

No COP node (and therefore no service node that is not on the same physical host) knows whether any other COP node has an assignment or not, or the content of any other assignment. To provide resiliency against short-term corruption, the jobs are redundantly 406 assigned by the COP nodes (according to a tunable parameter that can change dynamically according to COP attack risk estimate).

Jobs are actually executed (e.g., computed) 406 by the service nodes 407; as illustrated, these nodes are isolated from each other and can only communicate with each other or with the user through the COP 300 or one of the auxiliary COP services.

When a set of service nodes performing the same job complete their task, they forward their output to their corresponding COP node. The COP nodes with these same-job outputs jointly perform a private result checking protocol that does not reveal identities or results, and collectively the COP obtains hidden shares (as defined in Section 4.4) of the result obtained by the majority of service nodes. The COP then uses these shares for the next sequence of anonymous jobs. At the final stage, the COP takes the final result, that is the checked output 408, and forwards it to the user.

At any point during this process, an individual node knows only the information needed to run its own task; any global information used collectively by the COP nodes (such as job assignment information and intermediate job data) is unknown to individual COP nodes. This is to ensure that when an attacker controls any nodes on the same physical node, all the attacker can do is obtain information about that particular physical node and not about any other cloud data (e.g., how many nodes and which nodes are working on the same job). Since any COP node will always be reset (regenerated) by the RCPS to a pristine state at regular intervals (these intervals are also a tunable parameter), even if COP nodes are continuously corrupted, COP operation will continue unhindered, as explained further in Section 4.4.

(4.3) COP Capabilities

Figure 5:
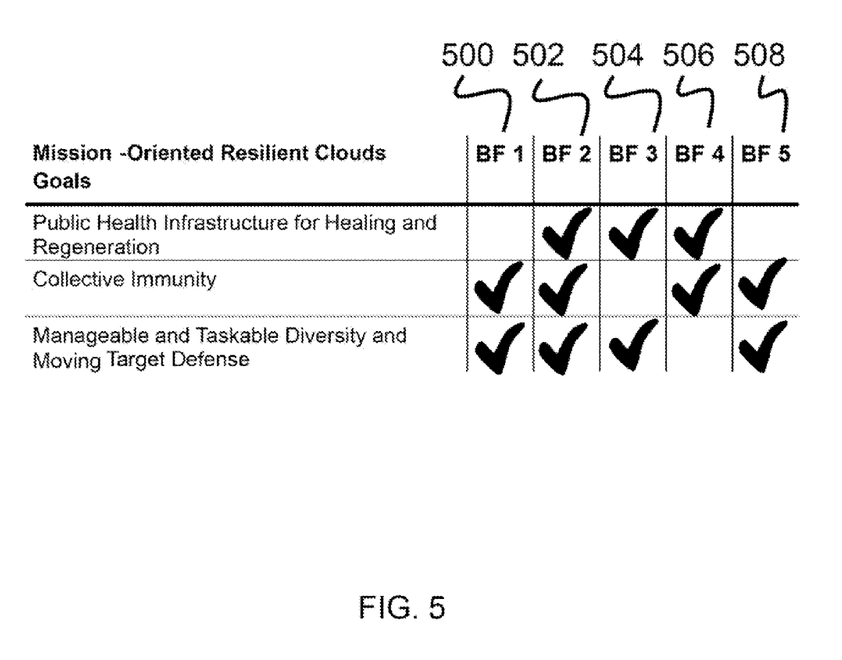
FIG. 5 is a table illustrating desired cloud capabilities achieved through a combination of basic functionalities (BF)

The following five basic functionalities (BF) of the COP achieve the goals of the architecture (as shown in FIG. 5). Provided below is a description of the functionalities and a comment as to which cryptographic building blocks are used to achieve them. Such building blocks include mobile proactive secret sharing (MPSS) and linear complexity multi-party secure computation (LMPC); see Section 4.4 for detailed descriptions of these cryptographic building blocks and how they accomplish these functionalities.

1. BF1 500: Secure and Resilient Result Checking: A mechanism to securely and resiliently check the result of a computation that was allocated redundantly to several machines using LMPC (where machines are not aware which other machines are assigned to the same task) to prevent mission failure due to corruption.
2. BF2 502: Secure and Resilient Sharing of Cloud State and Control Data: A mechanism that allows COP nodes to securely share data using MPSS such that if colluding compromised nodes are to recover or alter the shared data, they must control at least one sixth of all COP nodes. It should be noted that these mechanisms will be applied to the COP, but not to user-specified tasks.
3. BF3 504: Secure and Resilient Computation on Shared States and Data: An efficient mechanism to perform COP computations on data that is securely shared among nodes in the cloud using LMPC as well as MPSS. Such a computation is restricted to a predetermined set of COP computations that can all be represented as small-depth circuits to achieve the desired efficiency.
4. BF4 506: Regeneration of Compromised/Faulty Nodes: An RCPS mechanism that allows the cloud to regenerate a COP node at regular intervals. Regenerating a node entails restoring it to a clean, trusted state using MPSS and having it rejoin the COP. This allows any previously corrupted COP node, once restored to a corruption-free state, to rejoin the COP.
5. BF5 508: Secure and Anonymous Mapping of Computational Jobs: A mechanism to allocate jobs to service nodes randomly using LMPC and MPSS while preventing other nodes from inferring which service nodes were tasked with the job.

(4.4) Cryptographic Building Blocks

The design for the COP architecture is robust and resistant to attack; this is achieved by employing several pre-existing cryptographic primitives used as building blocks. One core concept is 't-out-of-n' secret-sharing (SS), where n players are each dealt a "share" of a secret and any t of them can use their shares to reconstruct the secret, but any fewer than t players working together have no information about the secret. The value t is typically called a threshold. In this example, it is a predetermined threshold number of players, a non-limiting example of which includes two. For purposes of the present invention, players are COP nodes and the secret is the COP's continuously evolving long-lived state. The COP state includes all the cloud control and assignment information as well as user inputs and outputs (I/O). Proactive secret-sharing (PSS) and mobile proactive secret-sharing (MPSS) are extensions of SS to more robust security models. The former (i.e., PSS) exhibits resilience against long term adversaries by allowing expiration of shares and share refresh mechanism, where even if some fraction of shares is captured by the adversary, the captured shares do not allow secret state discovery given the newly refreshed shares; the latter (i.e., MPSS) allows formation of dynamic groups of shareholders and provides tunable security guarantees at runtime.

Another important primitive is distributed error-correction, which provides redundancy and resiliency for user's long-lived data stored at service nodes even when they are attacked by an adversary. Extensions of batch codes (defined below) are used to achieve this.

Finally, secure multi-party computation (MPC) is used to securely perform the COP operations (using data that is secret-shared). MPC is able to securely compute any distributed functionality with n players, but for illustrative purposes, it is described herein for a very limited set of functionalities. The next five subsections provide an overview of each of the cryptographic building blocks and outline the extensions. Described is how each building block (when extended appropriately) can achieve the required basic functionalities in the COP architecture (see Section 4.3).

(4.4.1) Dynamically Tunable Proactive Secret Sharing

A secret sharing-scheme, introduced independently by Blakely (see Literature Reference No. 2) and Shamir (see Literature Reference No. 10), allows a dealer to distribute shares of a secret to parties such that only authorized subsets of parties can reconstruct the secret (see Literature Reference No. 1). More precisely, a t-out-of-n secret-sharing scheme among in parties is where a dealer (D) who has a secret (S) distributes shares to the parties such that any t players can reconstruct S from its shares, and no group of t−1 players or less can learn any information about S.

An extension of secret sharing called proactive secret-sharing (PSS) was introduced by Ostrovsky et al. (see Literature Reference No. 9). In their model, an adversary corrupts players at a constant rate; however, players are periodically rebooted to restore their state to a pristine state, and then other players engage them in a protocol for them to get proper shares. The rebooting has to be at least at the same rate of infection to overcome the attack. The PSS protocol in Ostrovsky et al. requires that time is divided into periods (epochs), and that at each epoch the adversary is limited in the number of shareholders it can infect (faulty shareholders or t−1). Their protocol requires the threshold t to be a small constant. In a PSS scheme, shareholders preserve the confidentiality and privacy of a shared secret by executing a refresh protocol (to generate a new sharing of the secret) and erasing their old shares. The refresh protocol in Ostrovsky et al. (see Literature Reference No. 9) is implemented using generic MPC, as described in Literature Reference No. 7.

Ordinary PSS schemes assume that the identities and shares of the shareholders are fixed over the lifetime of the protocol. In contrast, the COP applications according to the principles of the present invention require a secret sharing scheme which allows the set of players and the threshold to change. Adjusting the number of players n and the threshold t on the fly is a necessary feature in a long-lived cloud system, especially for a tunable system.

Adjusting the number of players n operates as an extension to PSS and has been termed mobile PSS, or MPSS (see Literature Reference No. 1). MPSS is used as a building block in COP whenever distributed COP state storage is required (see BFs 2-5 in Section 4.3).

(4.4.2) Balanced-Reconstruction Error Correction

In addition to COP data, there are certain cloud tasks that require user-provided long-lived data to be stored in the cloud. For example, consider the setting in which a large dataset is uploaded into the cloud and then multiple user-defined computational tasks are executed against the same large dataset. This user-provided data can be uploaded into service nodes. Since service nodes are also susceptible to adversarial attacks, error-correction mechanisms must be used that are not computationally expensive, and yet can recover from such faults.

In the distributed setting, error-correcting codes take on an additional dimension; namely, how to distribute (portions of) an error-correcting code across multiple nodes to balance the load when multiple portions of the coded information must be read at the same time. Thus, error-correction must not only specify how to encode the message but also how to split data across multiple nodes to allow load-balancing of multiple simultaneous reads. A batch code (see Literature Reference No. 8) encodes a string x into an m-tuple of strings, called buckets, such that each batch of k bits from x can be decoded by reading only a few bits from each bucket. Batch codes are of interest because they have the property that to reconstruct k bits can require at most t bits from each bucket. Batch codes are constructed specifically to balance redundancy with load balancing; this differs from generic error-correcting codes: inherently, there is no bound on how much an individual player has to contribute, and in the case where shares are distributed, an error-correcting code might, in theory, require that a single player is responsible for reconstruction. Batch codes are therefore well suited for the distributed case for large amounts of data (otherwise the load balancing concern is less acute). The reconstruction process for batch codes can also be quite efficient; for sub-cube codes (see Literature Reference No. 8), reconstruction occurs by XORing the information held by each player.

(4.4.3) Secure Multiparty Computation

Figure 6:
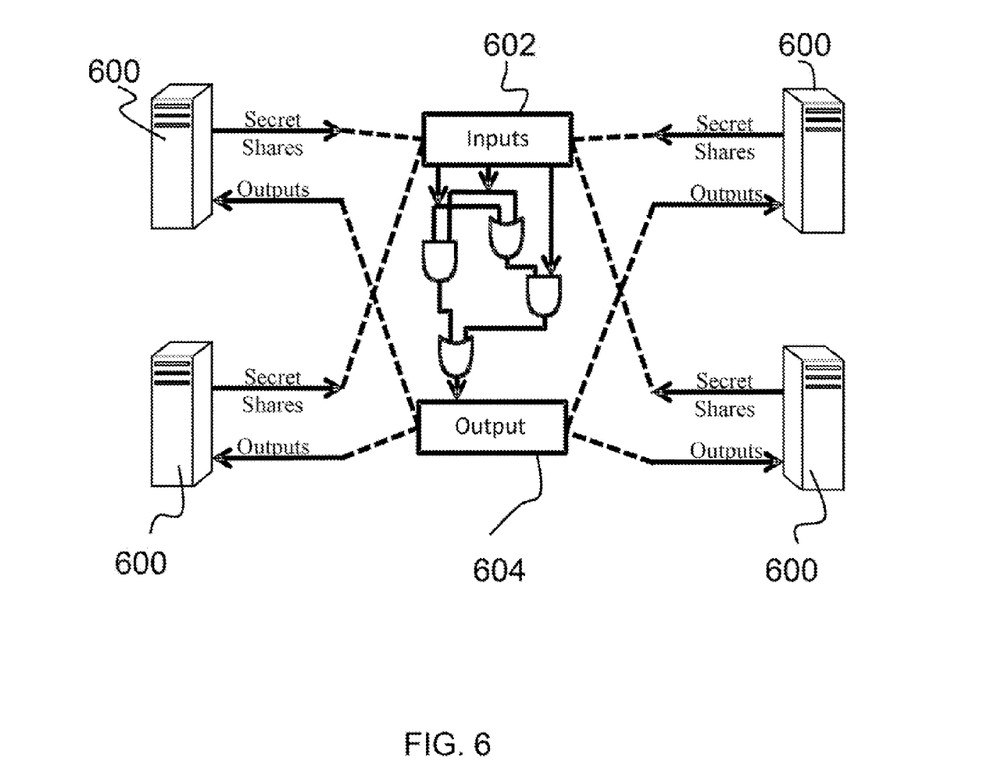
FIG. 6 is an illustration depicting an example of a multi-party computation (MPC).

Secure multiparty computation (MPC), illustrated in FIG. 6, is a cryptographic technique for multiple parties 600 to securely compute a function without revealing either their own private inputs 602 or their private outputs 604. More precisely, n players $P_1, \ldots P_n$ have inputs $x_1, \ldots x_n$, respectively, and wish to compute the function $f$ such that each player $P_i$ receives the output $f(x_1, \ldots x_n)_i$ without any player learning any other player's input or output. Generally, the functions are represented by circuits which fall into two categories: binary circuits and arithmetic circuits over a field F. Security for MPC is generally either defined in the honest-but-curious (HBC) model, where an adversary can "wiretap" but not change the computation, or in the malicious model, where the adversary can force nodes to deviate arbitrarily from the protocol specification. The MPC schemes were originally designed as a means for multiparty computation (see Literature Reference Nos. 3, 4, and 7). The number of communication rounds is the depth of the circuit; at a given depth, all intermediate gates are computed in parallel, using the information recovered from previous gates to compute the current ones without revealing the intermediate values. One of the most efficient schemes in the literature to accomplish multiparty computation is due to Damgård and Nielsen (see Literature Reference No. 6). Many of the COP basic functionalities (BFs 1, 3 and 5 in Section 4.3) require efficient secure computation; MPC can be used to implement these capabilities.

(4.4.4) Synchronous Vs. Asynchronous Networks

In a synchronous network setting, communication takes place via messages sent from one node to another using a global clock. Asynchronous networks are more realistic and provide protection against a stronger adversary model. The asynchronous model must accommodate the possibility of network delays and clock-drifts between different players. To handle delayed or dropped messages, the protocols will have a timeout period for each message round. This model of asynchronous networks is more limited than most general asynchronous network models in the cryptographic literature, but the approach is the most realistic for a cloud-computing setting. In the proactive security model, MPC protocols have been developed that are resilient against n/3 corrupted nodes; adapting to the asynchronous model causes that number to drop to n/6. When a majority of nodes report that they have completed a round, the COP plane in effect moves along to the next round with the majority's information. Since the proactive MPC scheme is resilient against n/3 players and the round termination protocol is resilient against n/2 players, the whole scheme is resilient against n/6 players.

What is claimed is:

1. A system for a cloud control operations plane, the system comprising:
   one or more processors and a memory, the memory being a non-transitory computer-readable medium having executable instructions encoded thereon, such that upon execution of the instructions, the one or more processors perform operations of:
      broadcasting an executable job to a plurality of physical hosts, each of the physical hosts having a single control operations plane (COP) node and one or more service nodes associated with the COP node;
      creating, jointly amongst a plurality of COP nodes, a private job assignment;
      redundantly distributing a first set of job assignments to individual COP nodes pursuant to the private job assignment, such that each individual COP node is only aware of its own assignment and corresponding job;
      executing, by the service nodes, the jobs assigned to the individual COP nodes such that the service nodes each complete a task associated with the job and generate an output;
      providing the output to the user.

2. The system as set forth in claim 1, wherein when a set of service nodes are performing a redundant job complete their task, forwarding the outputs to corresponding COP nodes, with the corresponding COP nodes jointly performing a private result checking protocol to generate the output.

3. The system as set forth in claim 2, wherein the COP nodes employ a mobile proactive secret sharing scheme which allows a set of COP nodes and a threshold number of COP nodes to change.

4. The system as set forth in claim 3, wherein the COP nodes operate using secure multi-party computation (MPC) to securely compute any distributed functionality.

5. The system as set forth in claim 4, wherein each COP node is periodically regenerated to a pristine state.

6. The system as set forth in claim 5, wherein each COP node is adapted to operate continuously, even if corrupted.

7. The system as set forth in claim 6, wherein each COP is adapted to provide anonymous communication between a set of service nodes completing a shared task, so that the set of services nodes can anonymously communicate with one another without obtaining information about each other and the physical nodes upon which the services nodes reside.

8. A method for a cloud control operations plane, the method comprising an act of:
   causing one or more processors to execute instructions encoded on memory, such that upon execution, the one or more processors perform operations of:
      broadcasting an executable job to a plurality of physical hosts, each of the physical hosts having a single control operations plane (COP) node and one or more service nodes associated with the COP node;
      creating, jointly amongst a plurality of COP nodes, a private job assignment;
      redundantly distributing a first set of job assignments to individual COP nodes pursuant to the private job assignment, such that each individual COP node is only aware of its own assignment and corresponding job;
      executing, by the service nodes, the jobs assigned to the individual COP nodes such that the service nodes each complete a task associated with the job and generate an output;
      providing the output to the user.

9. The method as set forth in claim 8, wherein when a set of service nodes are performing a redundant job complete their task, forwarding the outputs to corresponding COP nodes, with the corresponding COP nodes jointly performing a private result checking protocol to generate the output.

10. The method as set forth in claim 9, wherein the COP nodes employ a mobile proactive secret sharing scheme which allows a set of COP nodes and a threshold number of COP nodes to change.

11. The method as set forth in claim 10, wherein the COP nodes operate using secure multi-party computation (MPC) to securely compute any distributed functionality.

12. The method as set forth in claim 11, wherein each COP node is periodically regenerated to a pristine state.

13. The method as set forth in claim 12, wherein each COP node is adapted to operate continuously, even if corrupted.

14. The method as set forth in claim 13, wherein each COP is adapted to provide anonymous communication between a set of service nodes completing a shared task, so that the set of services nodes can anonymously communicate with one another without obtaining information about each other and the physical nodes upon which the services nodes reside.

15. A computer program product for a cloud control operations plane, the computer program product comprising:
   computer-readable instructions stored on a non-transitory computer-readable medium that are executable by a computer, such that upon execution of the instructions, one or more processors perform operations of:
      broadcasting an executable job to a plurality of physical hosts, each of the physical hosts having a single control operations plane (COP) node and one or more service nodes associated with the COP node;

creating, jointly amongst a plurality of COP nodes, a private job assignment;

redundantly distributing a first set of job assignments to individual COP nodes pursuant to the private job assignment, such that each individual COP node is only aware of its own assignment and corresponding job;

executing, by the service nodes, the jobs assigned to the individual COP nodes such that the service nodes each complete a task associated with the job and generate an output;

providing the output to the user.

16. The computer program product as set forth in claim 15, wherein when a set of service nodes are performing a redundant job complete their task, forwarding the outputs to corresponding COP nodes, with the corresponding COP nodes jointly performing a private result checking protocol to generate the output.

17. The computer program product as set forth in claim 16, wherein the COP nodes employ a mobile proactive secret sharing scheme which allows a set of COP nodes and a threshold number of COP nodes to change.

18. The computer program product as set forth in claim 17, wherein the COP nodes operate using secure multi-party computation (MPC) to securely compute any distributed functionality.

19. The computer program product as set forth in claim 18, wherein each COP node is periodically regenerated to a pristine state.

20. The computer program product as set forth in claim 19, wherein each COP node is adapted to operate continuously, even if corrupted.

21. The computer program product as set forth in claim 20, wherein each COP is adapted to provide anonymous communication between a set of service nodes completing a shared task, so that the set of services nodes can anonymously communicate with one another without obtaining information about each other and the physical nodes upon which the services nodes reside.

* * * * *